United States Patent [19]
Tanaka et al.

[11] Patent Number: 5,619,358
[45] Date of Patent: Apr. 8, 1997

[54] LIQUID CRYSTAL DISPLAY DEVICE WITH SEAL CONTACTING SUBSTRATES BETWEEN TWO CONDUCTIVE FILMS OF DUMMY ELECTRODES

[75] Inventors: Shozo Tanaka, Nara; Kazuya Yoshimura, Nara, both of Japan

[73] Assignee: Sharp Kabushiki Kaisha, Osaka, Japan

[21] Appl. No.: 556,699

[22] Filed: Nov. 13, 1995

[30] Foreign Application Priority Data

Nov. 14, 1994 [JP] Japan ................................ 6-279519

[51] Int. Cl.$^6$ ........................ G02F 1/1343; G02F 1/1339
[52] U.S. Cl. ........................... 349/143; 349/153; 349/155
[58] Field of Search ................................. 359/80, 81, 54

[56] References Cited

U.S. PATENT DOCUMENTS

| | | | |
|---|---|---|---|
| 4,854,675 | 8/1989 | Yamazaki et al. | 359/80 |
| 5,202,778 | 4/1993 | Niki | 359/80 |
| 5,396,356 | 3/1995 | Fukuchi | 359/80 |
| 5,406,398 | 4/1995 | Suzuki et al. | 359/80 |

FOREIGN PATENT DOCUMENTS

| | | | |
|---|---|---|---|
| 62-229234 | 10/1987 | Japan . | |
| 2-040630 | 2/1990 | Japan | 359/80 |
| 3-211524 | 9/1991 | Japan | 359/80 |
| 4-097321 | 3/1992 | Japan . | |
| 6-051332 | 2/1994 | Japan . | |

*Primary Examiner*—Anita Pellman Gross
*Attorney, Agent, or Firm*—David G. Conlin; Milton Oliver

[57] ABSTRACT

It is an object of the invention to prevent electrolytic corrosion occurring in the dummy electrodes from propagating into the display electrodes. In the liquid crystal display device, signal electrodes or scanning electrodes and dummy electrodes are formed on the surfaces of a pair of substrates, and a pair of substrate members in which an orientation film is formed on one side so as to cover the electrodes are pasted together at the circumferences through a sealing member so that the surfaces of the pair of substrates may confront each other and a space enclosed by the substrate members and the sealing member is filled with liquid crystal to form a liquid crystal layer. The dummy electrodes composed of first and second conductive films are formed separately, and the first conductive film is present in the region overlapped with the sealing member and the sealed space, and does not contact with the atmosphere. The first conductive film is also connected electrically to the signal electrode or scanning electrode. The second conductive film which contacts with the atmosphere is isolated, not connected electrically with the signal electrode and scanning electrode. Therefore, the corrosion occurring in the second conductive film does not propagate into the first conductive film, and hence the corrosion is prevented from propagating into the signal electrodes and scanning electrodes.

11 Claims, 10 Drawing Sheets

LIQUID CRYSTAL DISPLAY DEVICE WITH SEAL CONTACTING SUBSTRATES BETWEEN TWO CONDUCTIVE FILMS OF DUMMY ELECTRODES

BACKGROUND OF THE INVENTION

1. Field of the Invention

The present invention relates to a liquid crystal display device, more particularly to a liquid crystal display device having dummy electrodes.

2. Description of the Related Art

Liquid crystal display devices using liquid crystal are widely used recently. FIG. 12 is a simplified sectional view of a conventional liquid crystal display device 16a.

The liquid crystal display device 16a has a cell in which a pair of substrate members 7a, 7b are disposed apart from each other through a sealing member 5. The substrate member 7a includes a plurality of signal electrodes 3 on one surface 1a of a substrate 1 and the substrate member 7b includes a plurality of scanning electrodes 4 on one surface 2a of a substrate 2. Orientation films are formed on the respective surfaces 1a, 2a of the substrates 1, 2. The surfaces 1a, 2a including the signal electrodes 3 and the scanning electrodes 4, respectively confront each other, and liquid crystal is charged into the space enclosed by the surfaces 1a, 2a and the sealing member 5, thereby forming a liquid crystal layer 6.

In the liquid crystal display device 16a of such a constitution, an interval d2 between a portion having the signal electrodes 3 and a portion having the scanning electrodes 4, and an interval d1 between portions without electrodes 3, 4 are different, and hence the liquid crystal layer 6 placed between the pair of substrate members 7a, 7b is not uniform in thickness. In the liquid crystal display device 16a, since the color of the display screen of the device 16a varies, when voltage is not applied to the signal electrodes 3 and scanning electrodes 4, depending on the thickness of the liquid crystal layer 6, an uneven color occurs in the display screen if the liquid crystal layer 6 is not uniform in thickness as stated above.

A prior art for preventing this uneven color is disclosed, for example, in Japanese Unexamined Patent Publication JPA 62-229234 (1987). In the prior art, signal electrodes 3 and scanning electrodes 4 are provided on mutually confronting surfaces 1a, 2a of the pair of substrates 1, 2, and dummy electrodes having the same thickness as that of the electrodes 3, 4 are provided in the regions where electrodes 3, 4 on the surfaces 1a, 2a do not exist, thereby preventing the thickness of the liquid crystal layer 6 from being uneven and decreasing uneven color, Since the dummy electrodes are electrically isolated, the dummy electrodes may be charged by static electricity generated in the liquid crystal display device or the like. When a voltage necessary for display is applied to the signal electrodes 3 or scanning electrodes 4 confronting the dummy electrodes, if the dummy electrodes are charged, malfunction may occur, and undesired display may be made in a region not designed to be used for display.

A prior art for preventing such malfunction is disclosed in Japanese Unexamined Patent Publication JPA 6-51332 (1994) is known. FIG. 13 is a simplified sectional view of a liquid crystal display device 16b according to this prior art. In this prior art, dummy electrodes 12 are provided near a sealing member 13 at the outside of a confronting region of signal electrodes 10 and scanning electrodes 11 provided on surfaces at one side each of a pair of substrates 8, 9, and the dummy electrodes 12 are connected electrically to the confronting signal electrodes 10 or scanning electrodes 11 through a conductive spacer or the like existing in the sealing member 13 so as to be same in potential, thereby preventing malfunction. One substrate member 14 is composed of the substrate 8 and signal electrodes 10, and another substrate member 15 is composed of the substrate 9 and scanning electrodes 11.

Incidentally, Japanese Unexamined Patent Publication JPA 4-97321 (1992), relating to a liquid crystal display device for defining an interval of a pair of substrate members 14, 15 by a support member included in a sealing member 13, discloses an art for making uniform the thickness of liquid crystal layer, in which dummy electrodes are provided in a non-exisiting region of display electrodes such as signal electrodes 10 and scanning electrodes 11 in the end portion of the substrate, and a sealing member 13 is disposed between any two electrodes of signal electrode 10, scanning electrode 11, and dummy electrode, thereby adhering a pair of substrate members 14, 15.

The dummy electrodes 12 used in such a prior art, being disposed near the sealing member 13 and electrically connected with display electrodes such as signal electrodes 10 or scanning electrodes 11 may absorb moisture in the portion contacting with the atmosphere, for example, in the condition of use of high temperature and high humidity. When a voltage is applied to display electrodes such as signal electrodes 10 or scanning electrodes 11, an electric field is generated also between dummy electrodes 12 having the moisture absorbing portion and other electrodes 10, 11, and an electrolytic corrosion may occur in the moisture absorbing portion. When the corrosion progresses, the corrosion may also propagate into other display electrodes 10, 11 connected electrically. Variation of resistance value of the display electrodes 10, 11 is caused by the propagation of corrosion, and as a result a difference is caused between the resistance value of the corroded display electrodes 10, 11 and the resistance value of the corrosion-free display electrodes 10, 11, which may cause an uneven color in the display screen of the liquid crystal display device 16b. Moreover, as the corrosion advances, wire breakage or the like may be caused in the display electrodes 10, 11.

As a method of preventing such electrolytic corrosion, it may be considered to apply a moisture preventive agent on the outer circumference of the cell composed of the pair of substrate members 14, 15 and sealing member 13, that is, in the atmosphere contacting portion of the dummy electrodes 12. The moisture preventive agent is applied by pouring into the gap of the portion contacting with the atmosphere between the pair of substrate members 14, 15. At this time, the corners of the liquid crystal display device 16b are longer in the distance, as compared with the peripheral parts, from the edge of the substrate members 14, 15 to the surface portion contacting with the atmosphere of the sealing member 13, and the moisture preventive agent cannot permeate completely into the surface portion of the sealing member 13, and therefore the moisture preventive agent may not be applied to the surface portion of the sealing member 13 and its vicinity. It is hence known difficult to apply completely the moisture preventive agent on the whole circumference of the sealing member 13, especially in the corners.

It may be also considered to remove the portion of the dummy electrodes 12 contacting with the atmosphere in which electrolytic corrosion is likely to occur. In such method, although uneven display by corrosion may be prevented, it is known that uneven color is caused by difference of film thickness near the sealing member 13.

SUMMARY OF THE INVENTION

It is hence a primary object of the invention to provide a liquid crystal display device free from uneven color or the like by preventing the electrolytic corrosion of dummy electrodes from spreading into display electrodes.

To achieve the object, the invention provides a liquid crystal display device comprising:

a pair of substrate members, each member including an insulating substrate, display electrodes and dummy electrodes;

a sealing member arranged between the pair of substrate members, through which the circumferences of the substrate members are glued to form a space between the substrate members; and a liquid crystal layer formed by filling the space enclosed by the substrate members and the sealing member with liquid crystal, the display electrodes being formed on the liquid crystal layer side of the insulating substrate, the dummy electrodes being formed on the liquid crystal layer side of the insulating substrate for making the thickness of the liquid crystal layer uniform, wherein the dummy electrode is composed of a first conductive film and a second conductive film, between which is provided a gap positioned in the contact region where the sealing member contacts with the substrate member, and the first conductive film is arranged inside in comparison with the second conductive film.

Further the invention provides a liquid crystal display device comprising:

a pair of substrate members, at least one of which is light permeable, a sealing member arranged between the pair of substrate members, through which the circumferences of the pair of substrate members are glued to form a space between the pair of substrate members; and a liquid crystal layer formed by filling the space enclosed by the substrate members and the sealing member with liquid crystal, each substrate member including an insulating substrate and plural band-shaped display electrodes parallel with each other at intervals, the display electrodes being formed on the liquid crystal layer side of the insulating substrate, at least one of the substrate members including dummy electrodes for making the thickness of the liquid crystal layer uniform, the dummy electrodes being formed on the liquid crystal layer side of the insulating substrate, the band-shaped display electrodes of one substrate member being arranged so as to be at right angles to the band-shaped display electrodes of the other substrate member, wherein the dummy electrode is composed of a first conductive film and a second conductive film, between which is provided a gap positioned in the contact region where the sealing member contacts with the substrate member, and the first conductive film is arranged inside in comparison with the second conductive film.

The invention is characterized in that the dummy electrodes are disposed at both longitudinal ends of the gaps between the plural band-shaped display electrodes, and at corners of the region of the insulating substrate confronting the other insulating substrate.

The invention is characterized in that the dummy electrodes are disposed at both longitudinal ends of the regions of the insulating substrate confronting the display electrodes of the other substrate, and at corners of the region of the insulating substrate confronting the other insulating substrate.

The invention is characterized in that the pair of substrate members both comprise the dummy electrodes, the dummy electrodes of one of the pair of substrate members are formed at both longitudinal ends of the gaps between the plural band-shaped display electrodes of the one substrate member, and at corners of the region of the insulating substrate confronting the other insulating substrate, and the dummy electrodes of the other of the pair of substrate members are formed at both longitudinal ends of the gaps between the plural band-shaped display electrodes of the other substrate member.

The invention is characterized in that the pair of substrate members both comprise the dummy electrodes, the dummy electrodes of one of the pair of substrate members are formed at both longitudinal ends of the regions of the insulating substrate confronting the display electrodes of the other substrate, and at corners of the region of the insulating substrate confronting the other insulating substrate, and the dummy electrodes of the other of the pair of substrate members are formed at both longitudinal ends of the regions of the other substrate confronting the display electrodes of the one substrate member.

The invention is characterized in that the first conductive films are connected electrically to the display electrodes.

The invention is characterized in that the first conductive films of the dummy electrodes of the one and other substrate members are electrically connected to the adjacent display electrodes of the same substrate member sides.

The invention is characterized in that the first conductive films of the dummy electrodes formed in the regions of the respective substrate members confronting the display electrodes of the respective counterpart substrate members are electrically connected to the display electrodes of the respective counterpart substrate members.

The invention is also characterized in-that the connection portions of the first conductive films to the display electrodes are disposed in the contacting region.

According to the invention, the liquid crystal display device is constituted to isolate the liquid crystal layer from the atmosphere by enclosing the liquid crystal layer having a uniform thickness with a pair of substrate members and a sealing member, and a display is shown on a display screen of the liquid crystal display device by applying a predetermined voltage to a display electrode of each substrate member, formed at the liquid crystal layer side. Each substrate member includes dummy electrodes on the liquid crystal layer side to keep the thickness of the liquid crystal layer uniform. The dummy electrodes are formed as being separated into first conductive films and second conductive films. The dummy electrode is composed of a first conductive film and a second conductive film, between which is provided a gap positioned in the contact region where the sealing member contacts with the substrate member, and the first conductive film is arranged inside in comparison with the second conductive film. The inside end of the first conductive film is arranged to correspond to or be beyond the inside end of the contacting region, and therefore the first conductive film is no exposed to the air. The outside end of the second conductive film is arranged to correspond to or be beyond the outside end of the contacting region, and therefore the second conductive film is exposed to the air. The second conductive film is formed a predetermined distance apart from the first conductive film and display electrode, and is electrically isolated. Accordingly, the second conductive film does not have any portion electrically connected with the first conductive film and display electrode, so that an electrolytic corrosion generated in the second conductive film is prevented from propagating into the first conductive film and display electrode through electrically connected portion. In particular, the corrosion is prevented from propagating from the second conductive film having a wide area contacting with the atmosphere and formed at the corners of the substrate where corrosion is likely to occur. Moreover, since the first conductive film does not contact with the atmosphere, moisture is not absorbed, and corrosion may be prevented. In addition, since the first and second conductive films are disposed in the contacting region, the thickness of the liquid crystal layer near the sealing member may be made uniform.

Also according to the invention, in each substrate member plural band-shaped display electrodes are formed on the surface of the insulating substrate at the liquid crystal layer side so as to be parallel with each other at intervals. At least one of the substrate members includes the dummy electrodes. The substrate members are arranged so that the band-shaped display electrodes of one substrate member may orthogonally cross the band-shaped display electrodes of the other substrate member. Even in thus constituted liquid crystal display device, owing to the dummy electrodes composed of the first and the second conductive film the same as mentioned above, electrolytic corrosion is prevented from propagating into the display electrodes. Additionally, the thickness of the liquid crystal layer near the sealing member is uniform. Owing to the band-shaped display electrodes, a matrix display can realized by combination of pixels arranged in a matrix form in the confronting portion of the display electrodes of the substrate members.

Further, according to the invention, the dummy electrodes are disposed at both longitudinal ends of the gaps between the plural band-shaped display electrodes, and at corners of the regions of the insulating substrate confronting the other insulating substrate. Owing to thus arranged dummy electrodes, the thickness of the liquid crystal layer near the sealing member is uniform, and the display quality is enhanced.

Further, according to the invention, the dummy electrodes are disposed at both longitudinal ends of regions of one insulating substrate, the regions confronting the display electrodes of the other insulating substrate, and at corners of the regions of the insulating substrate confronting the other insulating substrate. When the dummy electrodes are thus arranged, the thickness of the liquid crystal layer near the sealing member is uniform, and the display quality is enhanced.

Also according to the invention, the pair of substrate members both comprise dummy electrodes. The dummy electrodes of one of the pair of substrate members are formed at both longitudinal ends of the gaps between the plural band-shaped display electrodes of the one substrate member, and at corners of the region of the insulating substrate confronting the other insulating substrate. The dummy electrodes of the other of the pair of substrate members are formed at both longitudinal ends of the gaps between the plural band-shaped display electrodes of other substrate member. By thus forming the dummy electrodes, electrolytic corrosion is prevented from propagating into the display electrodes, and the thickness of the liquid crystal layer near the sealing member is made uniform, so that a liquid crystal display device of high display quality may be realized.

Also according to the invention, the pair of substrate members both comprise the dummy electrodes. The dummy electrodes of one of the pair of substrate members are formed at both longitudinal ends of the regions of the insulating substrate confronting the display electrodes of the other substrate, and at corners of the region of the insulating substrate confronting the other insulating substrate, and the dummy electrodes of the other of the pair of substrate members are formed at both longitudinal ends of the regions of the other substrate confronting the display electrodes of the one substrate member. By thus forming the dummy electrodes, electrolytic corrosion is prevented from propagating into the display electrodes, and the thickness of the liquid crystal layer near the sealing member is made uniform, so that a liquid crystal display device of high display quality may be realized.

Also according to the invention, the first conductive films are connected electrically to the display electrodes. As a result, the display electrode and first conductive film are at the same potential, so that malfunction of the liquid crystal display device due to charging of the first conductive film may be prevented.

Also according to the invention, the first conductive film is electrically connected to the adjacent display electrode of the same substrate member side, and the display electrode and first conductive film are of the same potential, so that malfunction due to charging can be prevented.

Also according to the invention, the first conductive film is electrically connected to the confronting display electrode of the mutually different substrate member side, and the display electrode and first conductive film are of the same potential, so that malfunction due to charging can be prevented.

Also according to the invention, the connection portion of the first conductive film with the display electrode is disposed in the contacting region. Accordingly, electrolytic corrosion of the display electrode can be prevented.

Also according to the invention, the connection portion of the first conductive film with the adjacent display electrode at the same substrate member side, or the connection portion of the first conductive film with the confronting display electrode of the mutually different substrate member side is disposed in the contacting region. Accordingly, electrolytic corrosion of the display electrode can be prevented.

Thus, according to the invention, the liquid crystal display device has a liquid crystal layer enclosed by a pair of substrate members and a sealing member, and makes a display by applying a predetermined voltage to the display electrodes included in the substrate members. The substrate members have dummy electrodes at the liquid crystal layer side, and prevent uneven color due to difference in film thickness. The dummy electrode has two separated conductive films. The inside end of the first conductive film is arranged to correspond to or be beyond the inside end of the contacting region, and therefore the first conductive film is no exposed to the air and electrolytic corrosion is prevented. The second conductive film has no connection portion between the first conductive film and display electrode and therefore the second conductive film is in the electrically insulated state. The second conductive film apart from the first conductive film, and the outside end the second conductive film is arranged to correspond to or be beyond the outside end of the contacting region. In this way, the electrolytic corrosion occurring in the second conductive film is prevented from propagating into the first conductive film and display electrode. Therefore, it is effective to prevent deterioration of display quality due to change of resistance value of the display electrodes of the liquid crystal display device by corrosion or uneven color. Additionally, the thickness of the liquid crystal layer near the sealing member is uniform, and a high display quality is obtained.

Also according to the invention, the display electrodes are formed in a band shape, and the band-shaped display electrodes of the substrate members are arranged orthogonally. In such constitution, too, uneven display and deterioration of display quality due to electrolytic corrosion can be prevented. Additionally, the thickness of the liquid crystal layer near the sealing member can be made uniform, and a high display quality is obtained. Moreover, by the band-shaped display electrodes, a matrix display can be realized.

Also according to the invention, the dummy electrodes are disposed in the circumferences of the substrate including the gaps of the display electrodes, and owing to such dummy electrodes, the thickness of the liquid crystal layer near the sealing member is uniform, and a higher display quality is obtained.

Also according to the invention, the dummy electrodes are disposed in the circumferences of the substrate including the regions overlapping with the display electrodes, and by such dummy electrodes, the thickness of the liquid crystal layer near the sealing member is uniform, and a higher display quality is obtained.

Also according to the invention, both substrate members include the dummy electrodes, which are disposed in the circumferences of the substrates including the gaps between the display electrodes.

Also according to the invention, both substrate members include the dummy electrodes, which are disposed in the circumferences of the substrates including the regions overlapping with the display electrodes.

Also according to the invention, the first conductive film for composing the dummy electrode is electrically connected to the display electrode, and hence charging of the first conductive film to cause malfunction against the display electrode can be prevented, so that a liquid crystal display device without display error can be obtained.

Also according to the invention, the first conductive film is connected to the adjacent display electrode of the same substrate member side, and malfunction due to charging is prevented, so that a liquid crystal display device without display error can be obtained.

Also according to the invention, the first conductive film is connected to the confronting display electrode of the mutually different substrate member side, and malfunction due to charging is prevented, so that a liquid crystal display device without display error can be obtained.

Also according to the invention, the connection portion of the first conductive film with the display electrode is disposed in the contacting region. Such first conductive film does not contact with the atmosphere, and electrolytic corrosion does not occur, and corrosion does not invade into the display electrode through the connection portion. Hence, a liquid crystal display device of high quality without deterioration of display quality can be obtained.

Also according to the invention, the connection portion of the first conductive film with the adjacent display electrode of the same substrate member side or the connection part of the first conductive film with the confronting display electrode of the mutually different substrate member side is disposed in the contacting region. Such first conductive film does not contact with the atmosphere, and electrolytic corrosion does not occur, and corrosion does not invade into the display electrode through the connection portion. Hence, a liquid crystal display device of high quality without deterioration of display quality can be obtained.

The liquid crystal display device of the invention can be executed without practically changing the manufacturing process and manufacturing apparatus of the conventional liquid crystal display device, except that the mask used the etching process must be modified to a shape so as to form dummy electrodes and others in the invention, and can be executed without preparing new members, and hence it is easy to execute and it can be executed without practically increasing the production cost.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
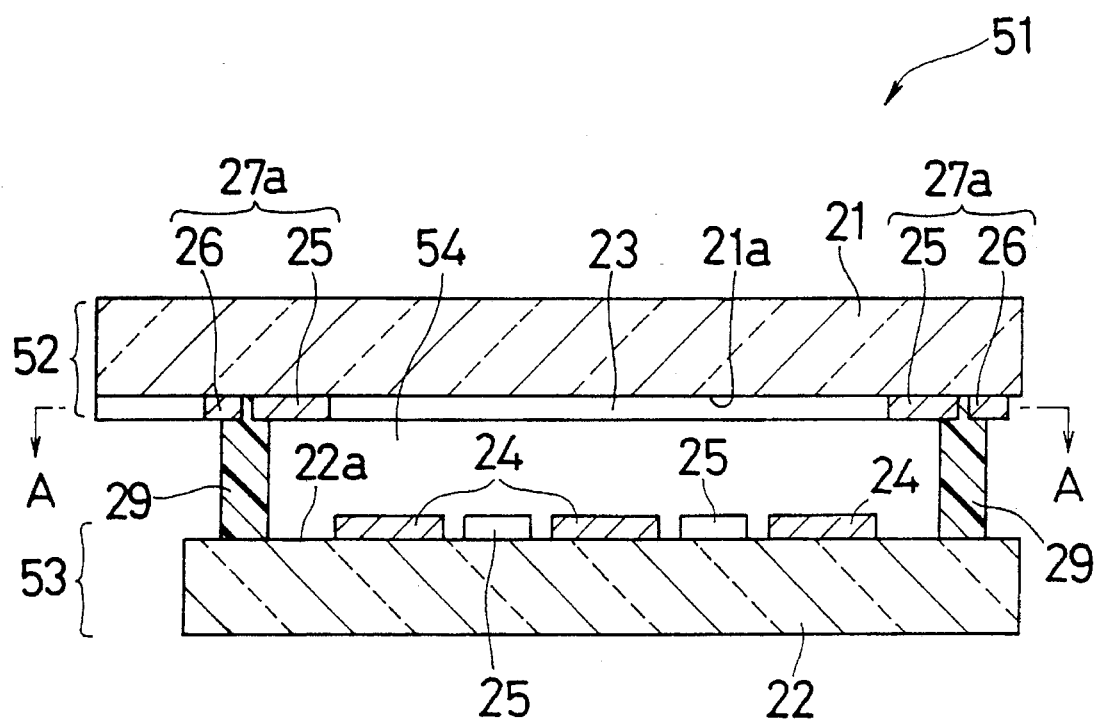
FIG. 1 is a sectional view showing a simplified structure of a liquid crystal display device 51 of an embodiment of the invention.

Now referring to the drawings, preferred embodiments of the invention are described below.

Figure 2:
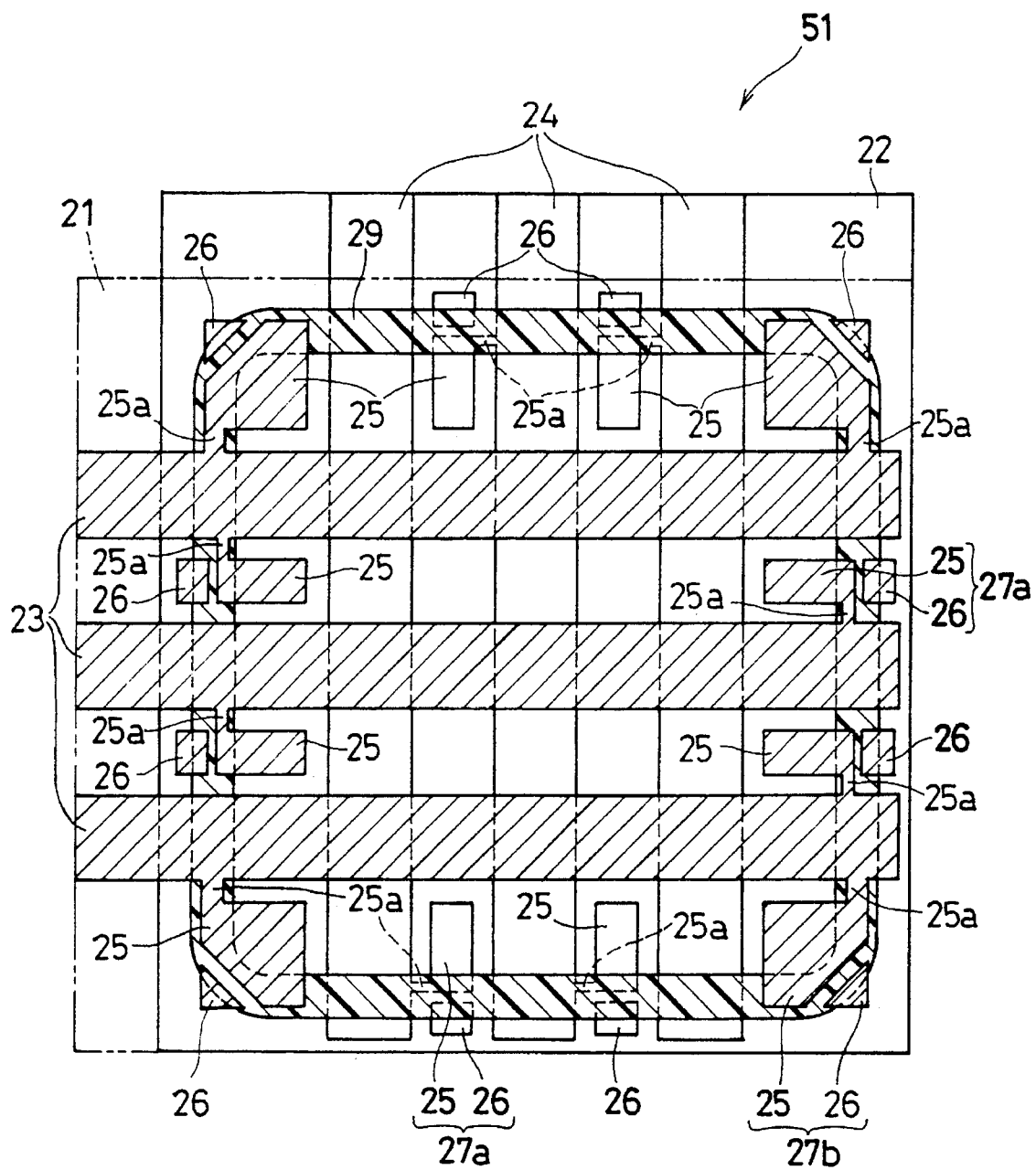
FIG. 2 is a sectional view taken on line A—A of the liquid crystal device 51 in FIG. 1.
Figure 3:
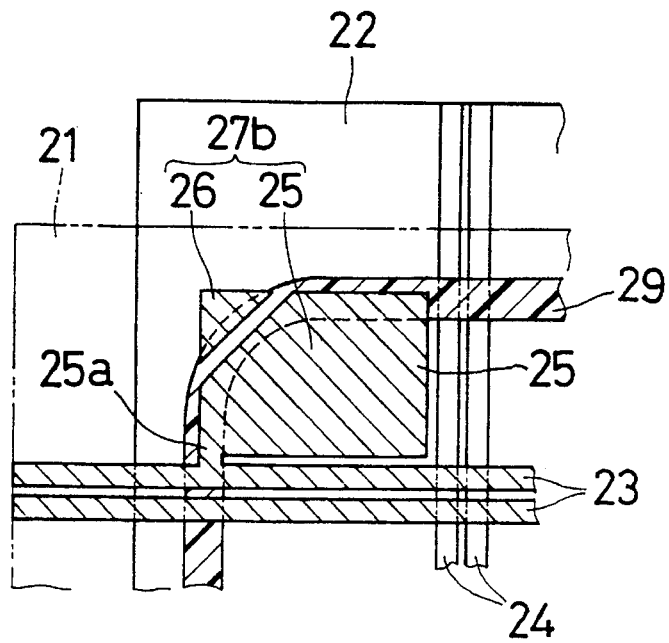
FIG. 3 is a partially magnified view of a corner part of the liquid crystal display device 51 in FIG. 2.
Figure 4:
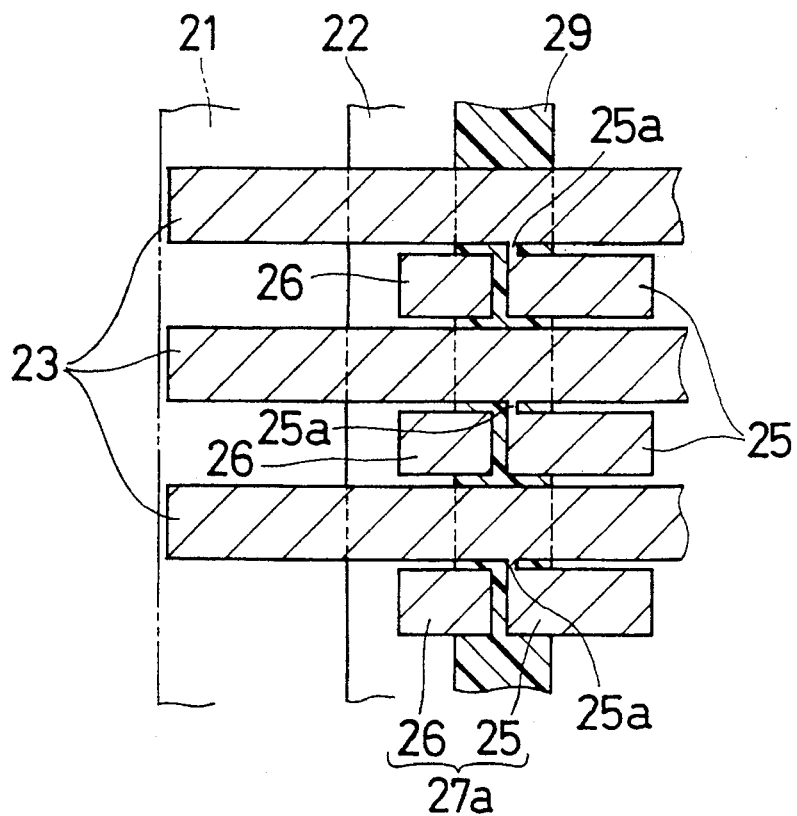
FIG. 4 is a partially magnified view of an end part of the liquid crystal display device 51 in FIG. 2.
Figure 5:
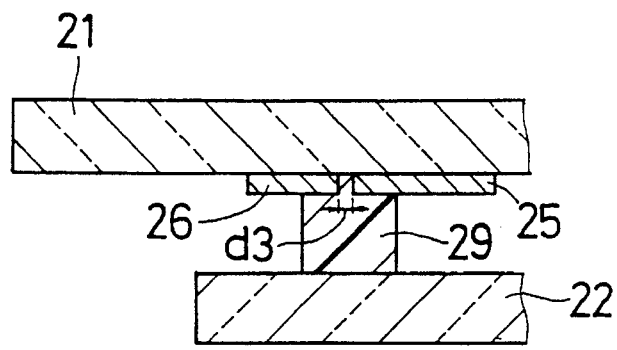
FIG. 5 is a partially magnified view of the liquid crystal display device 51 in FIG. 1.
Figure 6:
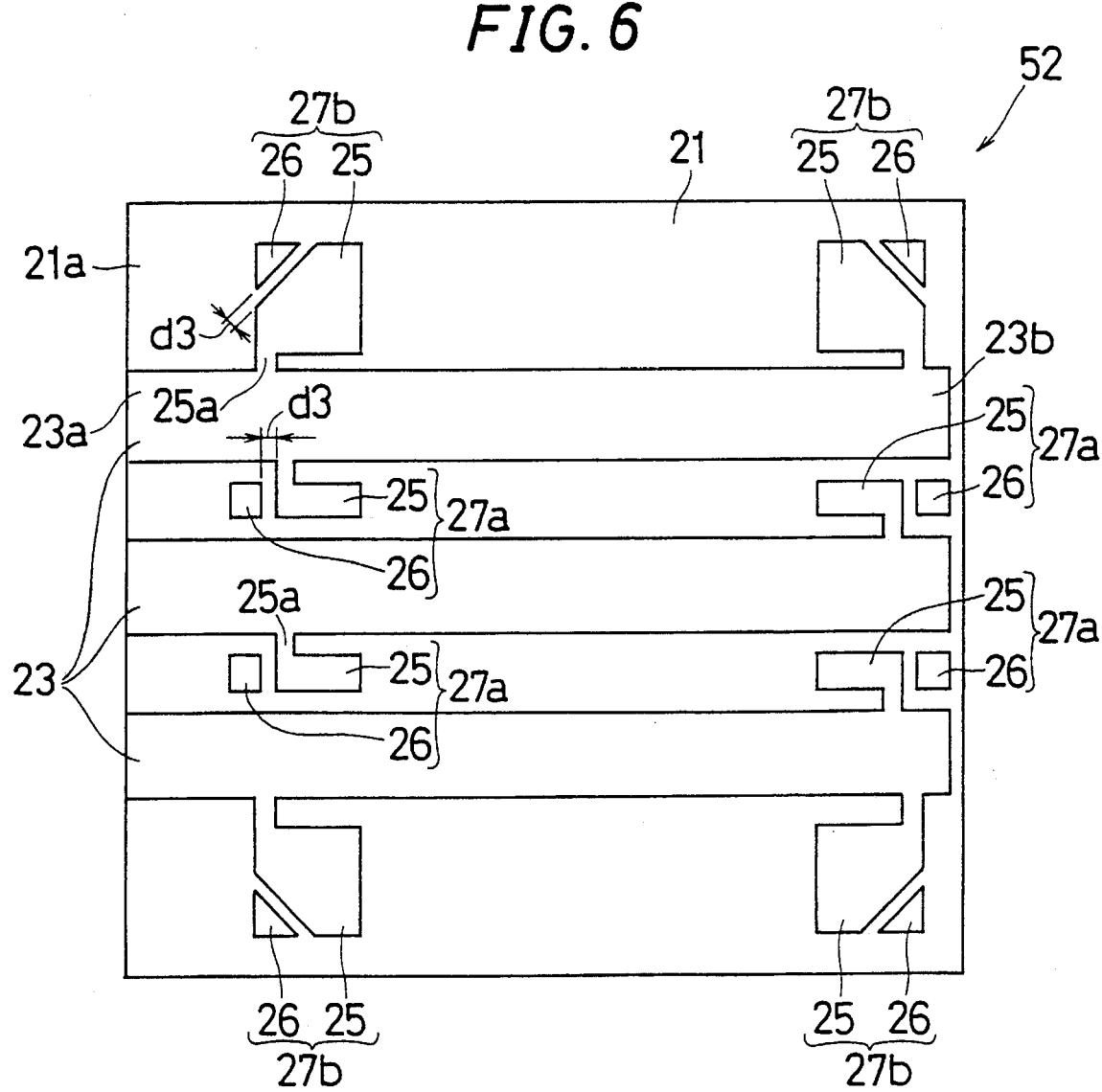
FIG. 6 is a plan view showing one substrate member 52 of the liquid crystal display device 51.
Figure 7:
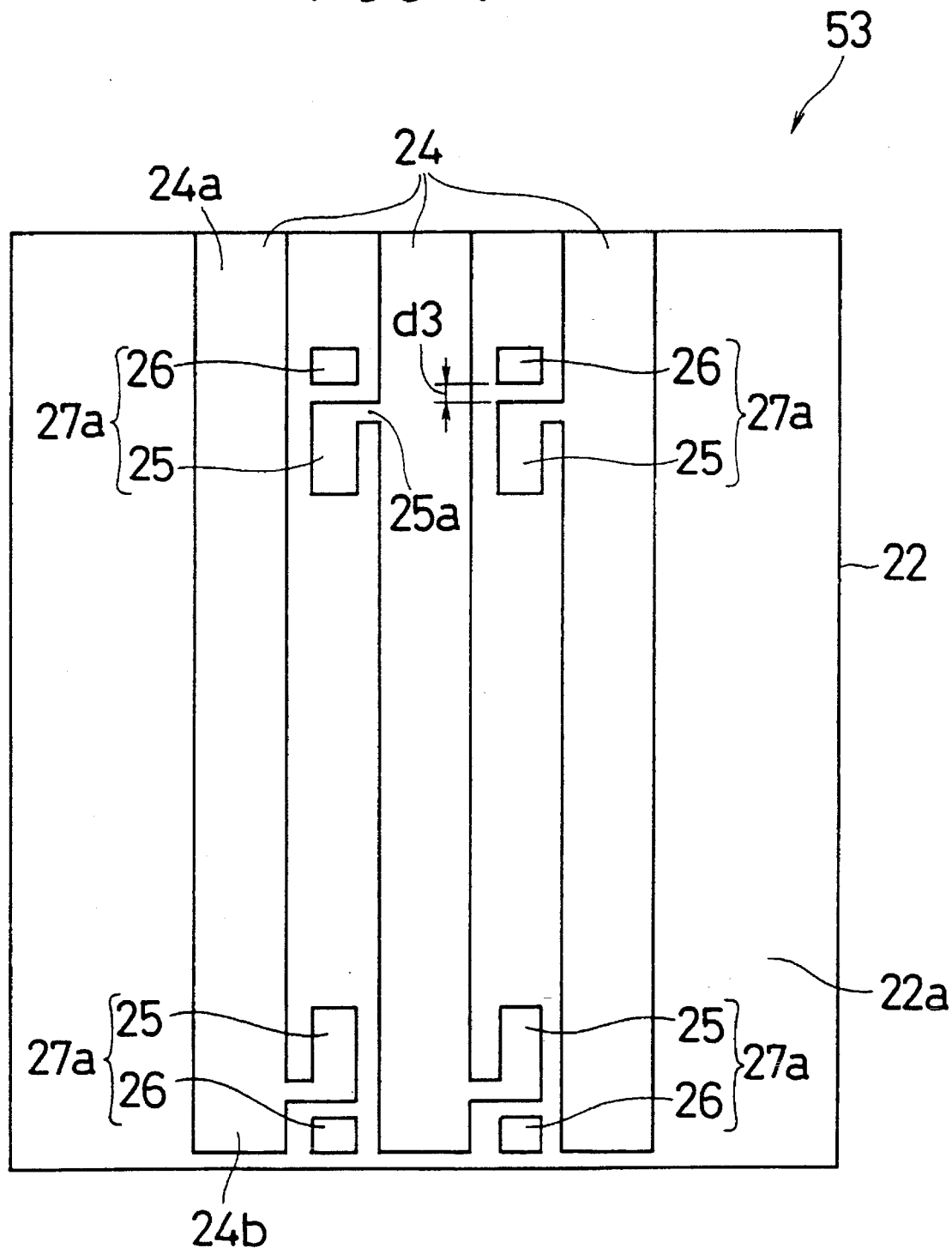
FIG. 7 is a plan view showing other substrate member 53 of the liquid crystal display device 51.

FIG. 1 is a sectional view showing a simplified structure of a liquid crystal display device 51 of an embodiment of the invention. FIG. 2 is a sectional view taken on line A—A of the liquid crystal device 51 in FIG. 1. FIG. 3 and FIG. 4 are partially magnified views of the liquid crystal display device 51 in FIG. 2, and FIG. 5 is a partially magnified view of the liquid crystal display device 51 in FIG. 1. FIG. 6 is a plan view showing one substrate member 52 for composing the liquid crystal display device 51. FIG. 7 is a plan view showing other substrate member 53 for composing the liquid crystal display device 51.

The liquid crystal display device 51 comprises a pair of substrate members 52, 53, one substrate member 52 of which has signal electrodes 23 and dummy electrodes 27a, 27b composed of first and second conductive films 25, 26 provided on one surface 21a of a substrate 21, and an orientation film (not shown) formed on the one surface 21a so as to cover the electrodes 23, 27a, 27b, and the other substrate member 53 of which has scanning electrodes 24 and dummy electrodes 27a composed of first and second conductive films 25, 26 provided on one surface 22a of a substrate 22, and an orientation film (not shown) formed on the one surface 22a so as to cover the electrodes 24, 27a. The circumferences of the substrate members 52, 53 are pasted through a sealing member 29 to keep a predetermined space between the substrate members 52, 53 and liquid crystal filled into the space enclosed by the sealing member 29 and the substrate members 52, 53 to form a liquid crystal layer 54. At least the substrate 21, signal electrodes 23, dummy electrodes 27a, 27b, and orientation film compose the one substrate member 52 of the pair of substrate members 52, 53, and at least the substrate 22, scanning electrodes 24, dummy electrodes 27a, and orientation film compose the other substrate member 53 of the pair of substrate members 52, 53.

Electrode films are individually formed on the surfaces 21a, 22a of the pair of substrates 21, 22 made of glass or the like by the sputtering method or the like. The electrode films are realized by ITO (indium tin oxide) or the like, and formed so that their surface resistivity may be, for example, about 10 to 250 ohms/square. Herein, "ohms/square" indicates the surface resistivity per a predetermined unit area. Consequently, by photo process or etching process or the like, the electrode films are processed to form plural signal electrodes 23 and plural dummy electrodes 27a, 27b on the substrate 21, and plural scanning electrodes 24 and plural dummy electrodes 27a on the substrate 22. The signal electrodes 23 and scanning electrodes 24 are formed in a band shape of which longer side reaches, for example, from one end of the substrate 21, 22 to the other end. The plural signal electrodes 23 are formed to be parallel with each other at intervals. The plural scanning electrodes 24 are similarly formed to be parallel with each other at intervals.

The dummy electrodes 27a, 27b are disposed in the peripheral area of the substrates 21, 22, and the first and second conductive films 25, 26 are formed, for example, in rectangular small pieces at predetermined intervals. The first conductive film 25 is formed at the end portions of the substrates 21, 22 so as to extend from the regions of the substrates 21, 22 where the sealing member 29 contacts with the substrate members 52, 53 toward the liquid crystal layer 54 side. The second conductive film 26 is formed at the end portions of the substrate 21, 22 so as to extend from the regions of the substrates 21, 22 where the sealing member 29 contacts with the substrate members 52, 53 toward the outside of the substrates 21, 22.

Referring also to FIG. 3 and FIG. 4, the first conductive film 25 at the liquid crystal layer 54 side is electrically connected with the signal electrodes 23 or scanning electrodes 24 existing on the same substrate through, for example, a connection portion 25a. Further referring to FIG. 5, the first conductive film 25 at the liquid crystal layer 54 side and the second conductive film 26 at the substrate end side are formed to have a distance d3 therebetween, and this distance d3 is, for example, 0.2 mm.

Referring to FIG. 2, the dummy electrodes 27a are disposed at both longitudinal ends of the gaps between the plural band-shaped signal electrodes 23, and at both longitudinal ends of the gaps between the plural band-shaped scanning electrodes 24, and the dummy electrodes 27b are respectively disposed at four corners of the rectangular region where the insulating substrates 52, 53 confront each other.

Referring to FIGS. 6 and 7, on one substrate member 52 having signal electrodes 23 in the embodiment, the dummy electrodes 27a are formed at both longitudinal ends of the gaps between signal electrodes 23 on one surface 21a of the substrate 21, and the dummy electrodes 27b are formed at both longitudinal ends of the outermost regions which are not occupied by the signal electrodes 23 on the one surface 21a of the substrate 21.

On the other substrate member 53 having scanning electrodes 24, the dummy electrodes 27a are formed at both longitudinal ends of the gaps between the scanning electrodes 24 on one surface 22a of the substrate 22.

On the surfaces 21a, 22a of the substrates 21, 22 where the electrodes 23, 24, 27a, 27b are formed, resin films (not shown) to be used as orientation films are formed so as to cover the electrodes 23, 24, 27a, 27b and the surfaces of the resin films are processed by an orientation process such as rubbing process to form orientation films. A pair of substrate members 52, 53 are individually formed through the above steps.

Subsequently, the sealing member 29 is formed on either of the pair of substrate members 52, 53 by printing or other method, for example, on the surface 22a of the substrate 22 of the substrate member 53. The sealing member 29 is formed so as to spread over almost the entire circumference of the substrate member 53 and have an injection clearance for injecting liquid crystal. The surfaces 21a, 22a of the substrates 21, 22 of the substrate members 52, 53, respectively, are set to be opposed to each other, and glued together leaving a predetermined space therebetween through the sealing member 29, thereby forming a cell.

As shown in FIGS. 3 and 4, the space between the first conductive film 25 and second conductive film 26 and the connection portion 25a of the first conductive film 25 are disposed immediately beneath the sealing member 29, that is, so as to overlap with the sealing member 29, and positioned between the surfaces 21a, 22a of the substrates 21, 22 of the substrate members 52, 53 and the sealing member 29. The sealing member 29 is formed so as to achieve such a configuration, and the substrate members 52, 53 are glued together.

At this time, the substrate members 52, 53 are arranged so that the signal electrode 23 and scanning electrodes 24 formed on the substrate 21, 22 may cross orthogonally each other. Since the first conductive film 25 is electrically connected with the adjacent electrodes 23, 24, the first conductive film 25 is prevented from being charged. As a result malfunction of the adjacent display electrodes 23, 24 is not caused. The second conductive film 26 is present, being isolated from the first conductive film 25 at a distance d3, but no electrode is present at the position confronting the second conductive film 26, and the liquid crystal layer 54 is not present between the second conductive film 26 and the electrode at the position confronting the second conductive film 26, and therefore even if the second conductive film 26 is charged, no effect is given to the display in the display screen of the liquid crystal display device 51. Additionally, the second conductive film 26 is small and accumulated electric charge is small, and therefore should a shortcircuit occurs, for example, between the second conductive film 26 and adjacent display electrodes 23, 24, the potential of the display electrodes 23, 25 hardly changes, so that no effect is given to the display. Or, by placing linear or spherical support members of the same diameter as the predetermined distance in the sealing member 29, the pair of substrate members 52, 53 may be pressed to be adhered.

Finally, through the clearance of the sealing member 29 for injecting liquid crystal, for example, liquid crystal transformed into isotropic liquid state by heating is injected into the space formed by the substrate members 52, 53 and sealing member 29, and the clearance of the sealing member 29 is sealed, and the liquid crystal is transformed into single crystal to form the liquid crystal layer 54. In this process, the liquid crystal display device 51 as shown in FIG. 1 and FIG. 2 is formed.

Forming the dummy electrodes 27a, 27b, the first conductive film 25 at the liquid crystal layer 54 side connected electrically to the signal electrode 23 or scanning electrode 24 is present in the region overlapped with the sealing member 29 and the space formed by the sealing member 29 and substrate members 52, 53, and is not in contact with the atmosphere, and hence moisture is not absorbed, thereby preventing electrolytic corrosion. Moreover, the second conductive film 26 extends from the region overlapping with the sealing member 29 toward the outside of the sealed space, so that uneven color of display screen near the sealing member 29 due to difference in film thickness can be prevented. Still more, since the second conductive film 26 is not connected electrically to the signal electrodes 23, scanning electrodes 24 and first conductive film 25, should an electrolytic corrosion occur in the second conductive film 26, the corrosion is prevented from invading into the electrodes 23, 24 and first conductive film 25.

Figure 8:
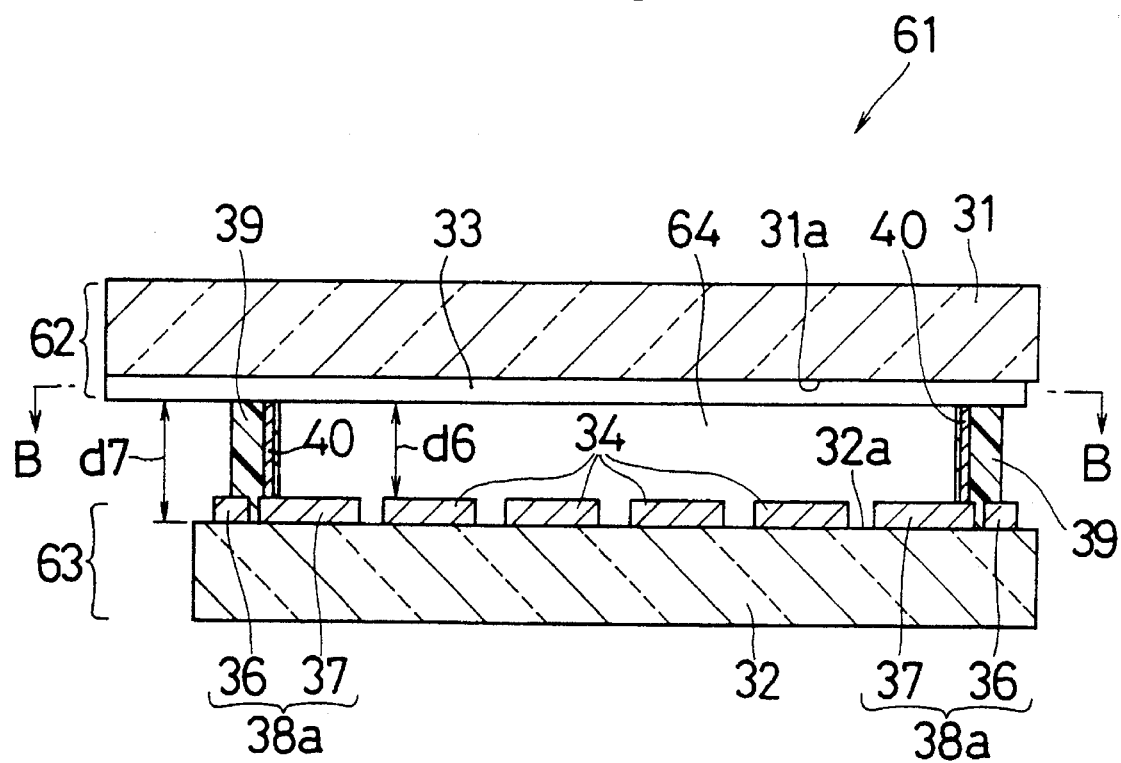
FIG. 8 is a sectional view of a liquid crystal display device 61 in other embodiment of the invention.
Figure 9:
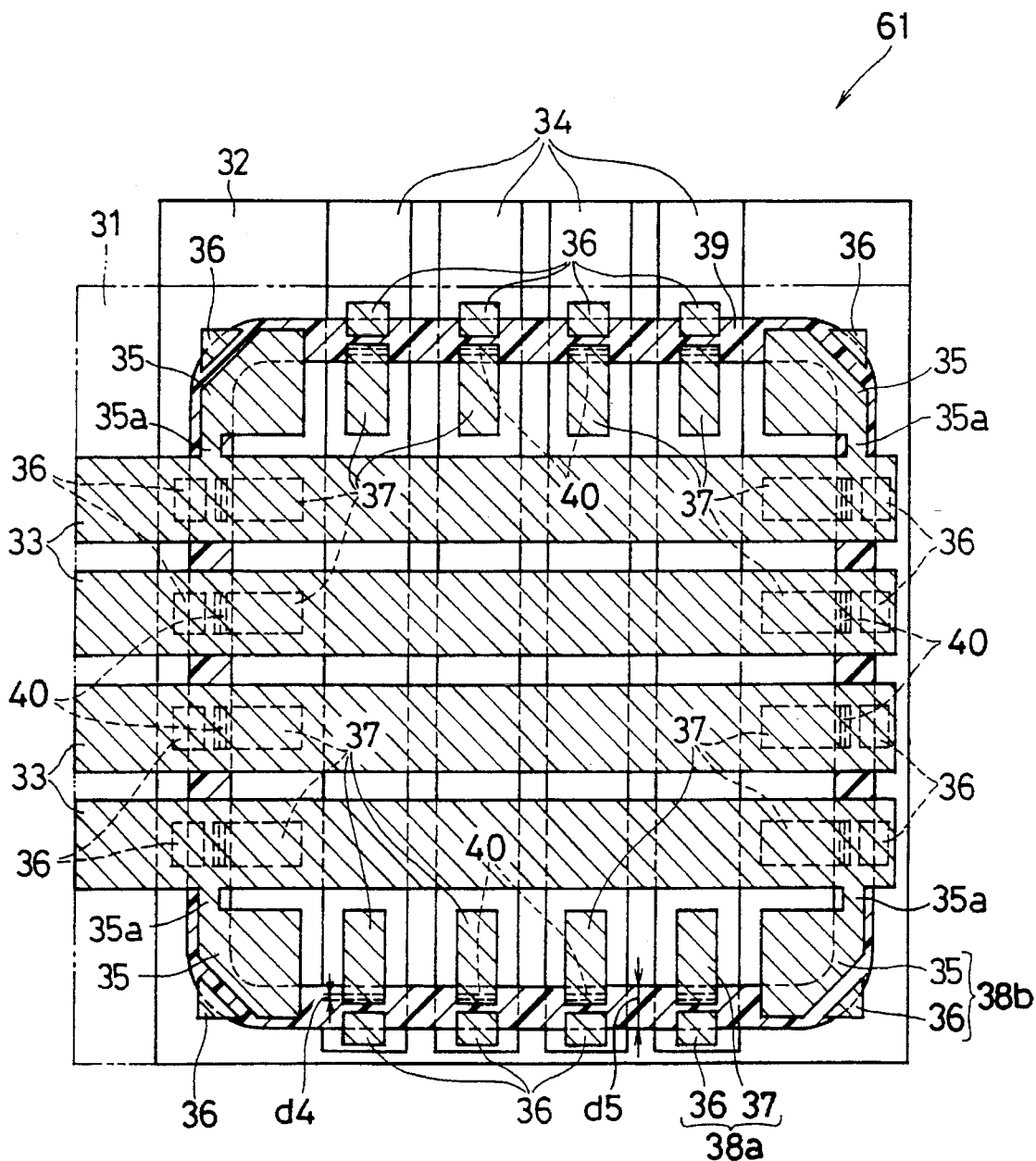
FIG. 9 is a sectional view taken on line B—B of the liquid crystal display device 61 in FIG. 8.
Figure 10:
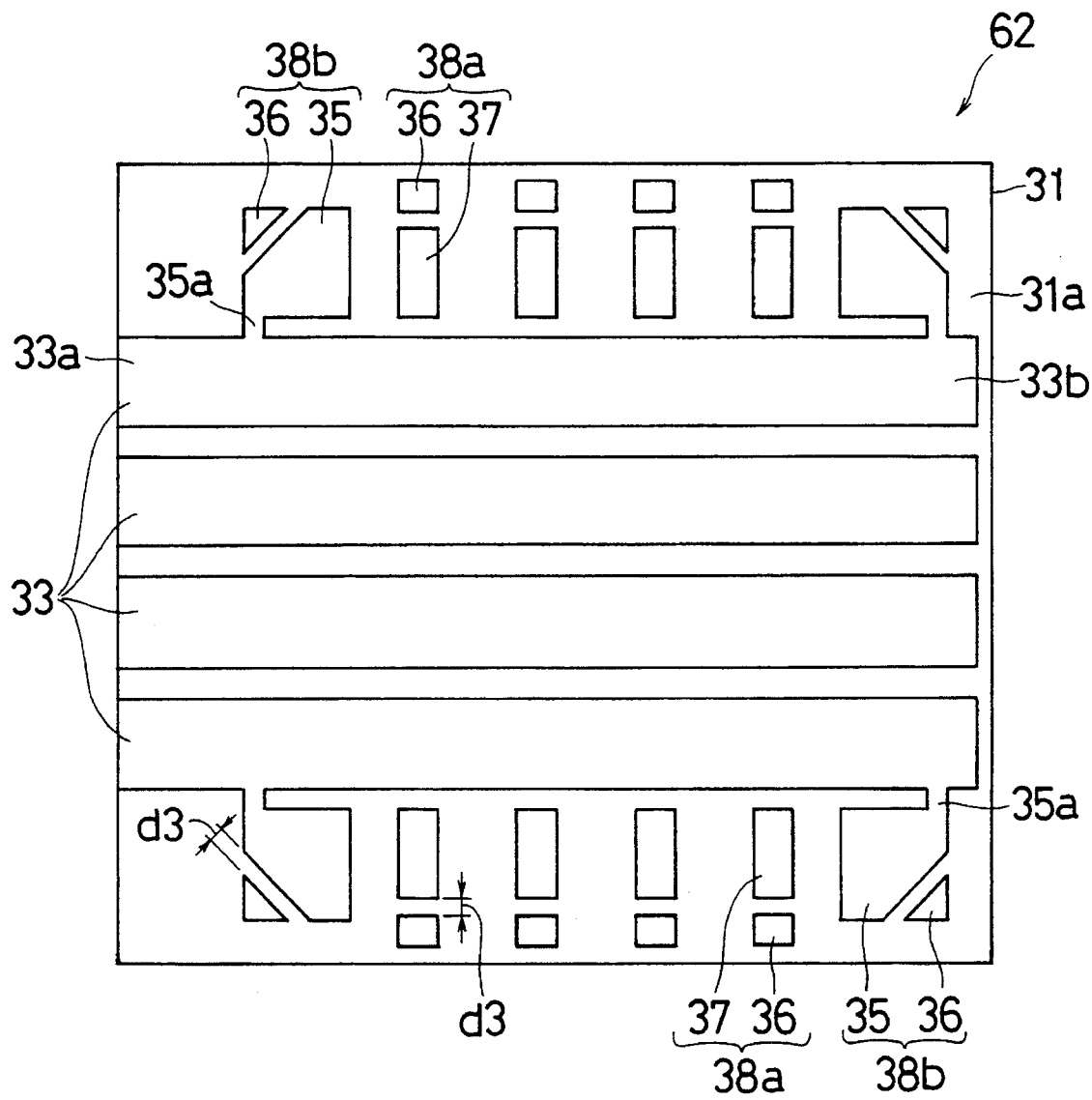
FIG. 10 is a plan view showing one substrate member 62 of the liquid crystal display device 61.
Figure 11:
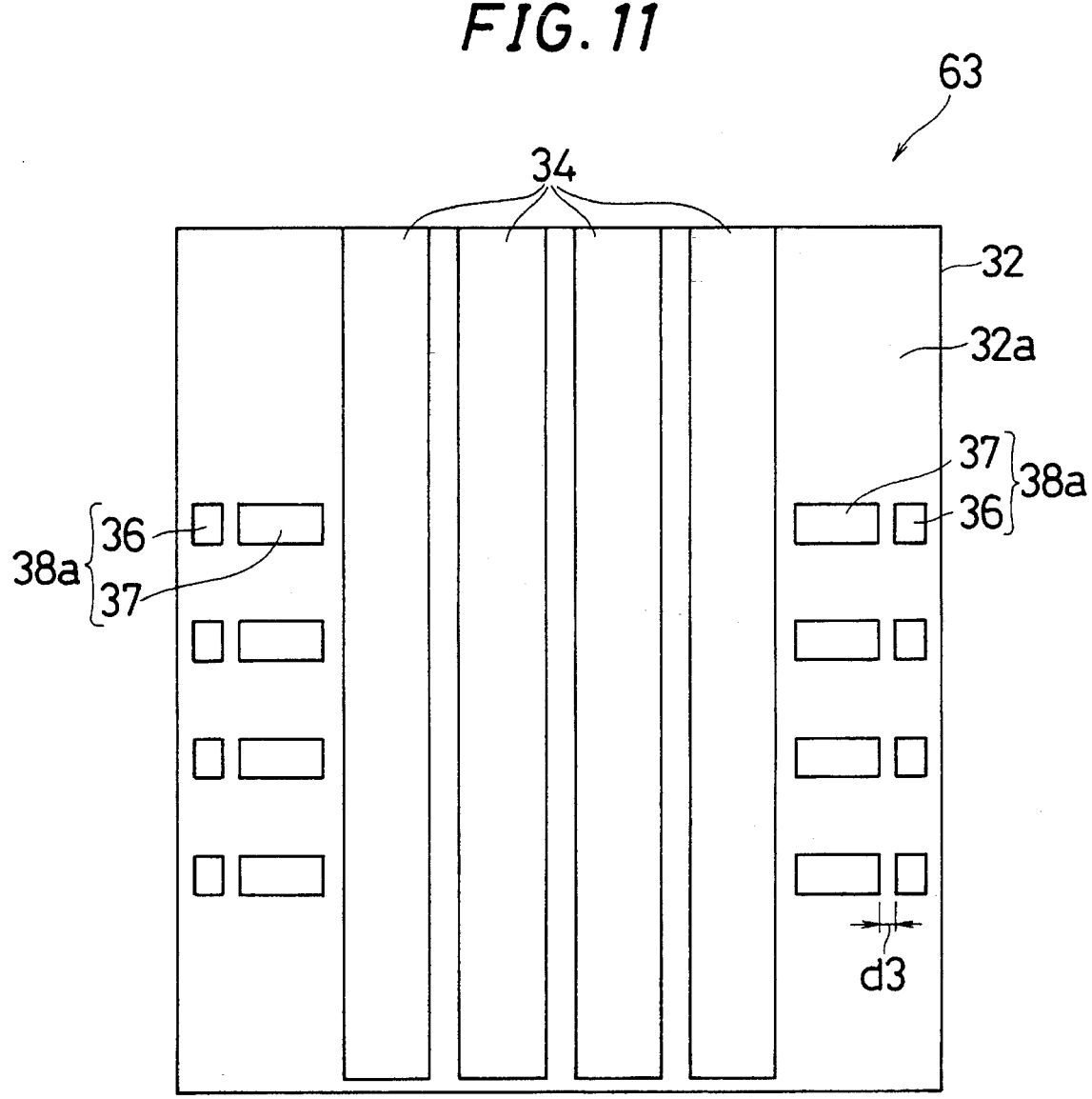
FIG. 11 is a plan view showing other substrate member 63 of the liquid crystal display device 61.
Figure 12:
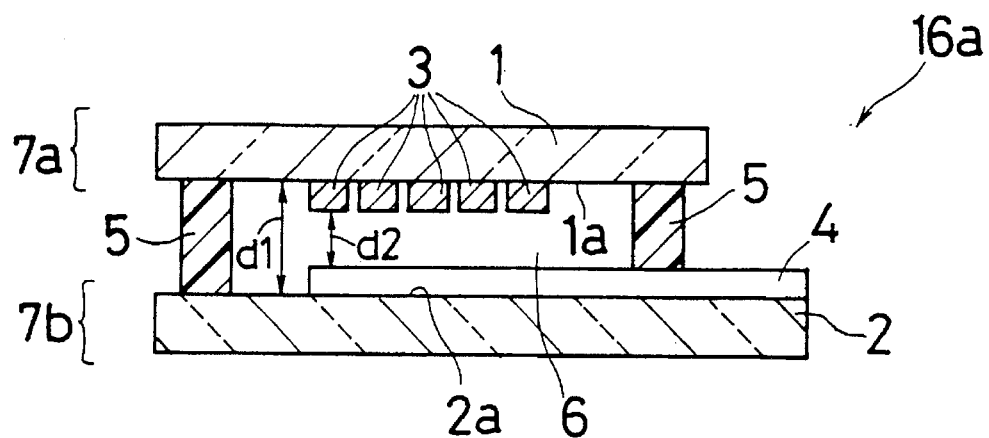
FIG. 12 is a simplified sectional view of a liquid crystal display device 16a of a prior art.
Figure 13:
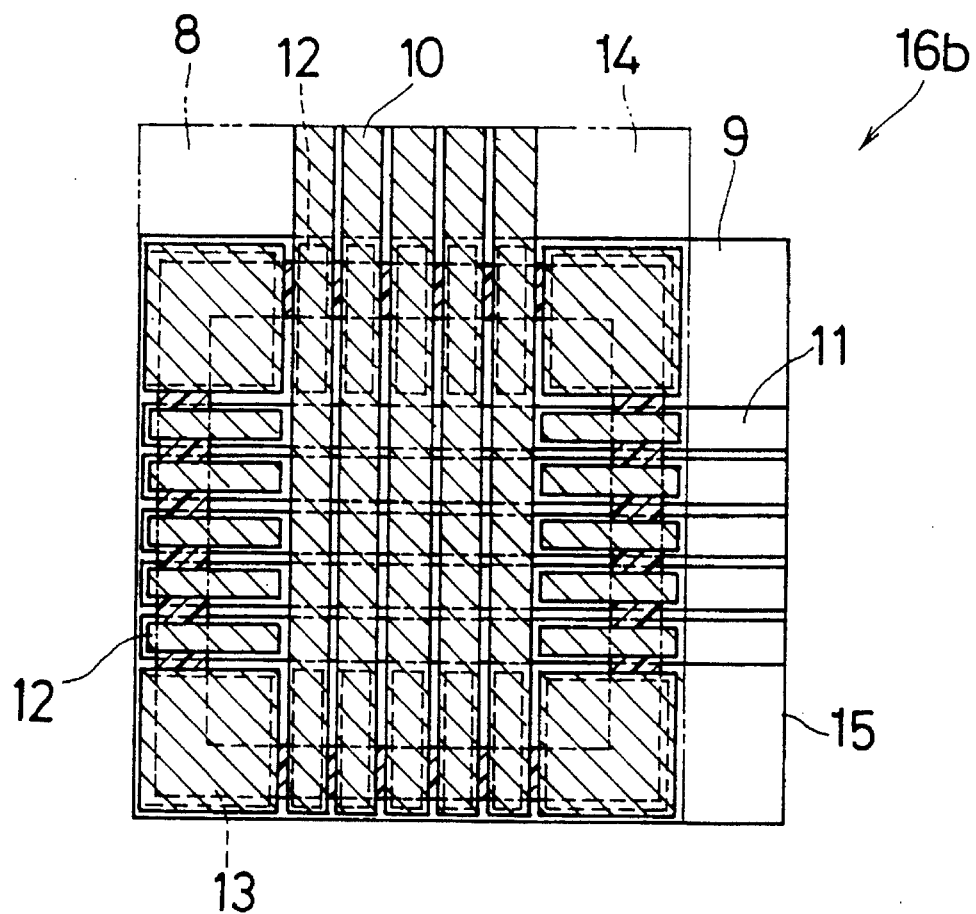
FIG. 13 is a simplified sectional view of a liquid crystal display device 16b in other prior art.

FIG. 8 is a sectional view of a liquid crystal display device 61 in other embodiment of the invention. FIG. 9 is a sectional view taken on line B—B of the liquid crystal display device 61 in FIG. 8. FIG. 10 is a plan view showing one substrate member 62 composing the liquid crystal display device 61. FIG. 11 is a plan view showing other substrate member 63 composing the liquid crystal display device 61.

The liquid crystal display device 61 of the embodiment comprises a pair of substrate members 62, 63, one substrate member 62 of which includes signal electrodes 33 and dummy electrodes 38a, 38b formed on one surface 31a of a substrate 31, and an orientation film formed on the one surface 31a so as to cover the electrodes 33, 38a, 38b, and the other substrate member 63 of which includes scanning electrodes 34 and dummy electrodes 38a formed on one surface 32a of a substrate 32, and an orientation film formed on the one surface 32a so as to cover the electrodes 34, 38a. The circumferences of the substrate members 62, 63 are pasted through a sealing member 39 so that the one surfaces 31a, 32a confront each other and a predetermined space is kept between the substrate members 62, 63, and liquid crystal is filled into the space enclosed by the sealing member 39 and the substrate members 62, 63 to form a liquid crystal layer 64. The dummy electrode 38a is composed of a first conductive film 37 and a second conductive film 36, and the dummy electrode 38b is composed of a first conductive electrode 35 and a second conductive film 36. By a conductive member 40 formed in either substrate member of the pair of substrate members 62, 63, the first conductive film 37 of the dummy electrode 38a, and the signal electrode 33 or scanning electrode 34 confronting the first conductive film 37 are electrically connected. The first conductive film 35 of the dummy electrode 38b is electrically connected to the signal electrode 33 or scanning electrode 34 existing on the same substrate through the connection portion 35a or the like. At least the substrate 31, signal electrodes 33, dummy electrodes 38a, 38b, and orientation film compose one substrate member 62 of the pair of substrate members 62, 63, and at least the substrate 32, scanning electrodes 34, dummy electrodes 38a, and orientation film compose the other substrate member 63 of the substrate members 62, 63.

On the surfaces 31a, 32a at one side each of the pair of substrates 31, 32 realized, for example, by transparent glass plates, electrode films realized by ITO or the like are individually formed by sputtering method or the like. The surface resistivity of the electrode films may be, for example, about 10 to 250 ohms/square. Consequently, by the photo process, the etching process or the like, the electrode films are processed, and signal electrodes 33 and dummy electrodes 38a, 38b are formed on the surface 31a of the substrate 31, while scanning electrodes 34 and dummy electrodes 38a are formed on the surface 32a of the substrate 32. In the embodiment, the same as the electrodes 23, 24, plural signal electrodes 33 and scanning electrodes 34 are formed in a band shape to be in parallel with each other at intervals.

The first and second conductive films 35, 37, 36 of the dummy electrodes 38a, 38b are respectively formed in a small rectangular piece. The dummy electrodes 38a, 38b are formed in the circumferences of the substrates 31, 32, and the dummy electrodes 38b of which are formed at the corners of the substrates 31, 32. The first conductive film 35, 37 is formed at the end portions of the substrates 31, 32 so as to extend from the regions of the substrates 31, 32 where the sealing member 39 contacts with the substrate members 62, 63 toward the liquid crystal layer 64 side. The second conductive film 36 is formed at the end portions of the substrate 31, 32 so as to extend from the regions of the substrates 31, 32 where the sealing member 39 contacts with the substrate members 62, 63 toward the outside of the substrates 31, 32. The first conductive film 35 of the dummy electrode 38b disposed at the corner of the substrate 31 is connected electrically to the signal electrode 33 adjacent on the same substrate by means of, for example, the connection portion 35a. Or the first conductive film 35 may be formed at one surface 32a of the substrate 32, and connected electrically to the scanning electrode 34 adjacent on the same substrate through the connection portion 35a. The first conductive films 35, 37 at the liquid crystal layer 64 side and the second conductive film 36 at the end side of the substrate are formed to have a distance d3 therebetween, and this distance d3 is, for example, 0.2 mm.

Referring to FIG. 9, the dummy electrodes 38a are disposed at both longitudinal ends of the region of one substrate member 63 confronting the plural band-shaped signal electrodes 33 of the other substrate member 62, and at both longitudinal ends of the region of one substrate member 62 confronting the plural band-shaped scanning electrodes 34 of the other substrate member 63, and the dummy electrodes 38b are disposed at four corners of the rectangular region where the insulating substrates confront each other.

Referring to FIG. 10 and FIG. 11, on one substrate member 62 including the signal electrodes 33 of the embodiment, the dummy electrodes 38a, 38b are formed in a region at the outward side of the substrate 31 of the outermost signal electrode 33 on one surface 31a of the substrate 31, in a confronting region of the scanning electrodes 34 of the other substrate member 63 and the outward side region, and in a region of the one and other end 33a, 33b side in the longitudinal direction of the signal electrodes.

On the other substrate member 63 including the scanning electrodes 34, the dummy electrodes 38a are formed in a region at the outward side of the substrate 32 of the outermost scanning electrode 34 on one surface 32a of the substrate 32, and in a confronting region of the signal electrodes 33 of the substrate member 62.

Covering the electrodes 33, 34, 38a, 38b on the surfaces 31a, 32a of the substrate 31, 32 forming the electrodes 33, 34, 38a, 38b, resin films as orientation films not shown are formed, and the resin film surface is treated for orientation by rubbing or the like, and the orientation film is formed. In this process, a pair of substrate members 62, 63 are formed.

On the surface 32a of the substrate 32 of either one substrate member, for example, substrate member 63, of the pair of substrate members 62, 63 undergoing orientation treatment, the sealing member 39 is formed by printing or other method, nearly on the entire circumference of the substrate member 63, across a clearance for injecting liquid crystal. The space between the first conductive films 35, 37 and second conductive film 36 and the connection portion 35a are disposed immediately beneath the sealing member 39, so as to be overlapped with the sealing member 39, and located between the sealing member 39 and substrate members 62, 63. On the surface 31a of the substrate 31 of the other substrate member 62 of the pair of substrate members 62, 63, conductive paste prepared, for example, by suspending silver powder in organic solvent in paste form is printed by screen printing or other method, and is half-cured by heat treatment to form the conductive member 40. The conductive member 40 is formed at the position which is on the display electrode such as the first conductive film 37 and signal electrode 33 formed on the surface 31a of the substrate 31 of the substrate member 62, and confronts the sealing member 39 formed on the substrate member 63. The width d4 of the conductive member 40 in the direction parallel with the longitudinal direction of the electrodes 33, 34 is narrower than the width d5 of the sealing member 39, and the thickness d6 of the conductive member 40 is formed nearly equal to the thickness d7 of the sealing member 39.

The pair of substrate members 62, 63 having the mutually confronting surfaces 31a, 32a, in which the signal electrodes 33 and scanning electrodes 34 are disposed orthogonally to each other are pasted through the sealing member 39 to keep a space, thereby forming a cell. At this time, when the pair of substrate members 62, 63 are arranged and pressed as described above, the conductive member 40 enters into the sealing member 39 by pushing apart the sealing member 39, and penetrates through the sealing member 39 to contact with the surface of the confronting electrode 34 on the substrate member 63. Afterwards, by heat treatment or the like, the conductive member 40 is electrically connected with the confronting electrode 34.

In this way, the first conductive electrode 37 is connected electrically to the confronting electrodes 33, 34, so that the first conductive film 37 is prevented from being charged to cause malfunction in the confronting electrodes, 33, 34. The second conductive electrode 36 is isolated, but there is no electrode at the confronting position of the second electrode 36. Additionally, liquid crystal layer 64 is not present between the second conductive film 36 and the display electrodes 33, 34 at the confronting position of the second conductive film 36, if the second conductive film 36 is charged, there is no effect on the display of the display screen of the liquid crystal display device 61. Besides, the second conductive film 36 is small, and only a small electric charge can be accumulated, and if a shortcircuit is formed between the second conductive film 36 and the adjacent display electrodes 33, 34, the potentials of the adjacent display electrodes 33, 34 are hardly changed, so that no effect is caused on the display.

Finally, liquid crystal is injected into the space formed by the substrate members 62, 63 and sealing member 39 from the clearance for injecting liquid crystal in the sealing member 39, and the clearance in the sealing member 39 is sealed, and the liquid crystal is transformed into single crystal, thereby forming the liquid crystal layer 64. In this process, the liquid crystal display device 61 shown in FIG. 8 and FIG. 9 is formed.

The first conductive films 35, 37 of the dummy electrodes 38a, 38b are present in the region overlapping with the sealing member 39 and space formed by the sealing member 39 and substrate members 62, 63, and do not contact with the atmosphere, and hence do not absorb moisture, so that electrolytic corrosion may be prevented. Additionally, the second conductive film 36 is present from the region overlapped with the sealing member 39 outward of the sealed space, and uneven color of display screen near the sealing member 39 due to difference in film thickness can be prevented. Besides, since the second conductive film 36 is not connected electrically with the display electrodes 33, 34 and first conductive films 35, 37, if corrosion occurs in the second conductive film 36, the corrosion is prevented from propagating into the electrodes 33, 34, and first conductive films 35, 37.

The liquid crystal display device 51 of the first embodiment and the liquid crystal display device 61 of the second embodiment were connected to an electric circuit for driving the individual devices 51, 61, and high temperature and high humidity tests were conducted by driving for 240 hours in the driving waveform applied state and high temperature and high humidity state of temperature of 40° C. and relative humidity of 95%. As a result, in both liquid crystal display device 51 in one embodiment and liquid crystal display device 61 in other embodiment, electric corrosion was caused in the second conductive films 26, 36 partly contacting with the atmosphere, but the corrosion did not invade into the first conductive films 25, 35, 37 of the liquid crystal layer 54, 64 side. Uneven color near the sealing members 29, 39 was not detected.

In the first embodiment, one substrate member 52 has dummy electrodes 27a, 27b, and the other substrate member 53 has dummy electrode 27a, but the dummy electrode 27b may be also formed at the other substrate member 53 side, which may be included in the scope of the invention, and in such a case the first conductive film 25 of the dummy electrode 27b is connected to the scanning electrode 24 through the connection portion 25a.

Similarly, in the second embodiment, one substrate member 62 has dummy electrode 38a, 38b, and the other substrate member 63 has dummy electrode 38a, but the dummy electrode 38b may be also formed at the other substrate member 63 side, which may be included in the scope of the invention, and in such a case the first conductive film 35 of the dummy electrode 38b is connected to the scanning electrode 34 through the connection portion 35a.

Combining these two embodiments, incidentally, the dummy electrodes may be formed in both region of gaps between the signal and scanning electrodes and in the region overlapping with the electrodes. As a result, the difference in film thickness near the sealing members may be further decreased, and uneven color of the display screen in the vicinity can be further reduced.

In the foregoing embodiments, considering that the connection portions 25a, 35a and conductive member 40 at the connection portions of the first conductive films 25, 37, 35 of the dummy electrodes 27a, 27b, 38a, 38b with the signal electrodes 23, 33 or scanning electrodes 24, 34 may overlap with the sealing members 29, 39, the dummy electrodes 27a, 27b, 38a, 38b are disposed at both substrate members 52, 62 and 53, 63, but if not considering such configuration, or when not connecting the first conductive films 25, 37, 35 and electrodes 23, 24, 33, 34, the dummy electrodes 27a, 27b, 38a, 38b may be provided at either substrates 52, 62, or substrates 53, 63.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:

a pair of substrate members, each member including an insulating substrate, display electrodes and dummy electrodes;

a sealing member arranged between the pair of substrate members, through which the circumferences of the substrate members are glued to form a space between the substrate members; and a liquid crystal layer formed by filling the space enclosed by the substrate members and the sealing member with liquid crystal, the display electrodes of each substrate member being formed on the liquid crystal layer side of the insulating substrate of the same substrate, the dummy electrodes of each substrate member for being formed on the liquid crystal layer side of the insulating substrate of the same substrate for making the thickness of the liquid crystal layer uniform, wherein each dummy electrode is composed of a first conductive film and a second conductive film, defining, between said films a gap positioned in a contact region where the sealing member contacts the substrate member, and the first conductive film is arranged laterally inside in relation to the second conductive film, and a portion of the second conductive film is outside the seal member.

2. A liquid crystal display device comprising:

a pair of substrate members, at least one of which is light permeable, a sealing member arranged between the pair of substrate members, through which the circumferences of the pair of substrate members are glued to form a space between the pair of substrate members; and a liquid crystal layer formed by filling the space enclosed by the substrate members and the sealing member with liquid crystal, each substrate member including an insulating substrate and plural band-shaped display electrodes parallel with each other at intervals, the display electrodes being formed on the liquid crystal layer side of the insulating substrate of the same substrate member, at least one of the substrate members including dummy electrodes for making the thickness of the liquid crystal layer uniform, the dummy electrodes being formed on the liquid crystal layer side of the insulating substrate of the same substrate member, the band-shaped display electrodes of one substrate member being arranged so as to be at right angles to the band-shaped display electrodes of the other substrate member, wherein each dummy electrode is composed of a first conductive film and a second conductive film, defining, between said film a gap positioned in a contact region where the sealing member contacts the substrate member, and the first conductive film is arranged laterally inside in relation to the second conductive film, and a portion of the second conductive film is outside the seal member.

3. The liquid crystal display device of claim 1 or 2, wherein the first conductive films are connected electrically to the display electrodes.

4. The liquid crystal display device of claim 3, wherein the connection portions of the first conductive films to the display electrodes are disposed in the contacting region.

5. The liquid crystal display device of claim 2, wherein the dummy electrodes are disposed at both longitudinal ends of the gaps between the plural band-shaped display electrodes of the at least one substrate member, and at corners of the region where one insulating substrate confronts the other insulating substrate.

6. The liquid crystal display device of claim 2, wherein the dummy electrodes are disposed at both longitudinal ends of the regions where the insulating substrate of the at least one substrate member confronts the display electrodes of the other insulating substrate, and at corners of the region where one insulating substrate confronts the other insulating substrate.

7. The liquid crystal display device of claim 2, wherein the pair of substrate members both comprise the dummy electrodes, the dummy electrodes of one of the pair of substrate members being formed at both longitudinal ends of the gaps between the plural band-shaped display electrodes of the one substrate member, and at corners of the region where one insulating substrate confronts the other insulating substrate, the dummy electrodes of the other of the pair of substrate members being formed at both longitudinal ends of the gaps between the plural band-shaped display electrodes of the other substrate member.

8. The liquid crystal display device of claim 7, wherein the first conductive films of the dummy electrodes of each substrate members are electrically connected to the adjacent display electrodes of the same substrate member.

9. The liquid crystal display device of claim 2, wherein the pair of substrate members both comprise the dummy electrodes, the dummy electrodes of one of the pair of substrate members being formed at both longitudinal ends of the regions where the insulating substrate of the same substrate member confronts the display electrodes of the other insulating substrate, and at corners of the region where one insulating substrate confronts the other insulating substrate, and the dummy electrodes of the other of the pair of substrate members being formed at both longitudinal ends of the regions of the other insulating substrate confronts the display electrodes of the one substrate member.

10. The liquid crystal display device of claim 9, wherein the first conductive films of the dummy electrodes formed in the regions where respective substrate members confronts the display electrodes of the respective counterpart substrate members are electrically connected to the display electrodes of the respective counterpart substrate members.

11. The liquid crystal display device of claim 8 or 10, wherein the connection portions of the first conductive films to the display electrodes are disposed in the contacting region.

* * * * *